US009845748B2

(12) United States Patent
Hoki (10) Patent No.: US 9,845,748 B2
(45) Date of Patent: Dec. 19, 2017

(54) INTERNAL COMBUSTION ENGINE

(71) Applicant: Toyota Jidosha Kabushiki Kaisha, Toyota-shi, Aichi-ken (JP)

(72) Inventor: Yusuke Hoki, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 175 days.

(21) Appl. No.: 14/816,171

(22) Filed: Aug. 3, 2015

(65) Prior Publication Data

US 2016/0040629 A1 Feb. 11, 2016

(30) Foreign Application Priority Data

Aug. 8, 2014 (JP) .................................. 2014-162618

(51) Int. Cl.
| | |
|---|---|
| F02M 25/06 | (2016.01) |
| F02D 41/00 | (2006.01) |
| F02M 26/25 | (2016.01) |
| F02M 26/14 | (2016.01) |
| F02M 26/17 | (2016.01) |
| F02M 26/35 | (2016.01) |
| F02M 26/53 | (2016.01) |

(52) U.S. Cl.
CPC ......... *F02D 41/0065* (2013.01); *F02M 26/25* (2016.02); *F02M 26/14* (2016.02); *F02M 26/17* (2016.02); *F02M 26/35* (2016.02); *F02M 26/53* (2016.02); *Y02T 10/47* (2013.01)

(58) Field of Classification Search
CPC .............................. F02M 26/35; F02M 26/25
See application file for complete search history.

(56) References Cited

FOREIGN PATENT DOCUMENTS

| | | |
|---|---|---|
| EP | 2570644 A1 | 3/2013 |
| JP | 58-41241 A | 3/1983 |
| JP | 2005-042569 A | 2/2005 |
| JP | 2008-057496 A | 3/2008 |
| JP | 2009-216056 A | 9/2009 |
| JP | 2010-71135 A | 4/2010 |
| JP | 2011-032968 A | 2/2011 |
| WO | 2011-141988 A1 | 11/2011 |

*Primary Examiner* — Mark Laurenzi
*Assistant Examiner* — Jason Sheppard
(74) *Attorney, Agent, or Firm* — Dinsmore & Shohl LLP (57) ABSTRACT

The invention reduces exhaust emission by quickly supplying CO2 into a cylinder, and restraining a delay in EGR, when an EGR request occurs. An engine 10 includes an upstream EGR passage 34, a middle EGR passage 36, a downstream EGR passage 38, a bypass passage 40, an EGR valve 42, a changeover valve 44, an EGR cooler 46, a CO2 adsorbent 48. When an EGR request does not occur, the ECU 70 keeps a temperature of the CO2 adsorbent 48 in a release temperature region by the heater 50, and opens the EGR valve 42 by a valve opening set time period t so that a gas in the middle EGR passage 36 is replaced with CO2 released from the CO2 adsorbent. When an EGR request occurs, CO2 accumulated in the middle EGR passage 36 can be quickly supplied into a cylinder, without releasing CO2 from the CO2 adsorbent 48.

20 Claims, 4 Drawing Sheets

INTERNAL COMBUSTION ENGINE

BACKGROUND OF THE INVENTION

Field of the Invention

The present invention relates to an internal combustion engine that is applied to an automobile or the like, and more particularly relates to an internal combustion engine including an EGR mechanism and a $CO_2$ adsorbent.

Background Art

As a prior art, there is known an internal combustion engine including an EGR mechanism and a $CO_2$ adsorbent as is disclosed in Patent Literature 1 (Japanese Patent Laid-Open No. 2005-042569), for example. The internal combustion engine of the prior art includes two EGR passages and a changeover valve that switches a channel for an EGR gas between these EGR passages. The $CO_2$ adsorbent adsorbs and releases $CO_2$ in response to a temperature state, and is disposed in only one of the EGR passages. In the prior art, when there is a request (an EGR request) to lower a combustion temperature in a cylinder, and the $CO_2$ adsorbent is in such a temperature state that the $CO_2$ adsorbent can release $CO_2$, the changeover valve is driven, and the EGR gas is recirculated into an intake system from the EGR passage where the $CO_2$ adsorbent is disposed.

[Patent Literature 1] Japanese Patent Laid-Open No. 2005-042569

[Patent Literature 2] Japanese Patent Laid-Open No. 2011-032968

[Patent Literature 3] Japanese Patent Laid-Open No. 2008-057496

[Patent Literature 4] International Publication No. WO 2011/141988

SUMMARY OF THE INVENTION

Technical Problem

In the aforementioned prior art, when an EGR request suddenly occurs, an action of releasing $CO_2$ from the $CO_2$ adsorbent is not in time, and a necessary amount of $CO_2$ cannot be released in some cases. In this case, insufficiency of the amount of $CO_2$ which is released from the $CO_2$ adsorbent, and a time delay until the released $CO_2$ reaches the inside of the cylinder are combined, whereby a delay of the EGR increases, and the problem of increasing exhaust emission arises.

The present invention is made to solve the problem as described above, and an object of the present invention is to provide an internal combustion engine which can reduce exhaust emission by quickly supplying $CO_2$ into a cylinder, and restraining a delay in EGR, when an EGR request occurs.

Means for Solving the Problem

According to a first aspect of the present invention, an internal combustion engine comprises an EGR passage that is connected to an intake passage and an exhaust passage of an internal combustion engine, and recirculates part of an exhaust gas to the intake passage as an EGR gas; an EGR valve that is provided in the EGR passage, and regulates an amount of the EGR gas which is recirculated to an intake system via the EGR passage; a $CO_2$ adsorbent that is provided in the EGR passage at an upstream side of the EGR valve, and has a function of adsorbing $CO_2$ in an adsorption temperature region and a function of releasing $CO_2$ in a release temperature region that is higher in temperature than the adsorption temperature region; a heater for heating the $CO_2$ adsorbent; and a control device that controls the EGR valve and the heater, wherein the control device is configured to keep a temperature of the $CO_2$ adsorbent in the release temperature region by the heater, and open the EGR valve for a valve opening set time period which is set so that a gas in an EGR partial passage of the EGR passage, which is located between the $CO_2$ adsorbent and the EGR valve, is replaced with $CO_2$ that is released from the $CO_2$ adsorbent, when an EGR request does not occur.

According to a second aspect of the present invention, the valve opening set time period is configured to be set based on a flow of a gas that flows into the internal combustion engine, and an opening degree of the EGR valve.

According to a third aspect of the present invention, the control device is configured to keep the EGR valve in a state in which the EGR valve is opened by such a small opening degree that does not worsen a combustion state in a cylinder, and replace the gas in the EGR partial passage with the $CO_2$.

According to a forth aspect of the present invention, the control device is configured to open the EGR valve after heating the $CO_2$ adsorbent by the heater, when replacing the gas in the EGR partial passage with the $CO_2$.

According to a fifth aspect of the present invention, the internal combustion engine further comprises a bypass passage that configures a part of the EGR passage, and is connected in parallel with the EGR partial passage to bypass the EGR partial passage; and a changeover valve that is driven by the control device, and switches a channel of the gas to either the EGR partial passage or the bypass passage, wherein the control device is configured to includes a first determination value that is set to correspond to a small engine load which does not need EGR, and a second determination value that is set at a value larger than the first determination value, and corresponds to an engine load that can be handled by EGR without using $CO_2$, release $CO_2$ from the $CO_2$ adsorbent to accumulate the $CO_2$ in the EGR partial passage, when the engine load is smaller than the first determination value, execute EGR without using $CO_2$ by causing the EGR gas to flow through the bypass passage, when the engine load is larger than the first determination value, and is smaller than the second determination value, and execute EGR using $CO_2$ by causing the EGR gas to flow through the EGR partial passage, when the engine load is larger than the second determination value.

According to a sixth aspect of the present invention, the internal combustion engine further comprises an EGR cooler that is provided in the EGR partial passage and cools a gas.

Advantageous Effects of Invention

According to the first invention, when an EGR request does not occur, the $CO_2$ which is released from the $CO_2$ adsorbent can be accumulated in the EGR passage. Accordingly, when an EGR request occurs from the state, the $CO_2$ which is accumulated in the EGR passage can be quickly supplied into the cylinder by opening the EGR valve. That is to say, when an EGR request occurs, a time taken to release $CO_2$ from the $CO_2$ adsorbent is not needed, and therefore, EGR using $CO_2$ can be quickly started. Accordingly, a delay in EGR which easily occurs at a transition time is restrained, and exhaust emission can be reduced.

According to the second invention, the valve opening set time period can be properly set based on the intake air amount, the opening degree of the EGR valve and the like. Thereby, a gas staying in the EGR passage can be stably replaced with the CO2 which is released from the CO2 adsorbent. That is to say, insufficiency of the accumulation amount of CO2, and leakage of CO2 to the intake passage due to an excessive accumulation operation can be avoided.

According to the third invention, at the time of execution of the control of accumulating CO2, the CO2 concentration in the intake passage and the cylinder is increased, and the effect of restraining NOx can be improved. Further, the valve opening time period of the EGR valve 42 does not have to be managed, and therefore, the control can be simplified.

According to the fourth invention, the CO2 adsorbent during heating can be prevented from being cooled by the flow of the exhaust gas, and heating can be performed efficiently. Accordingly, heating of the CO2 adsorbent is completed in a short time, and controllability can be improved.

According to the fifth invention, when such an EGR request that does not requires CO2 occurs, the exhaust gas to be the EGR gas can be caused to flow through the bypass passage. Thereby, at the time of low-load operations such as an operation after deceleration and an idle operation, for example, the CO2 which is accumulated in the EGR partial passage is kept, and wasteful consumption of CO2 can be avoided. Accordingly, only when CO2 is required, the accumulated CO2 can be efficiently used. Further, occurrence of a misfire and the like as a result of CO2 being supplied into the cylinder at the time of a low-load operation can be avoided.

According to the sixth invention, the high-temperature CO2 which is released from the CO2 adsorbent can be efficiently cooled by the EGR cooler. Accordingly, the temperature of the EGR gas which flows into the cylinder can be restrained, and the combustion temperature can be lowered.

BEST MODE OF CARRYING OUT THE INVENTION

Figure 1:
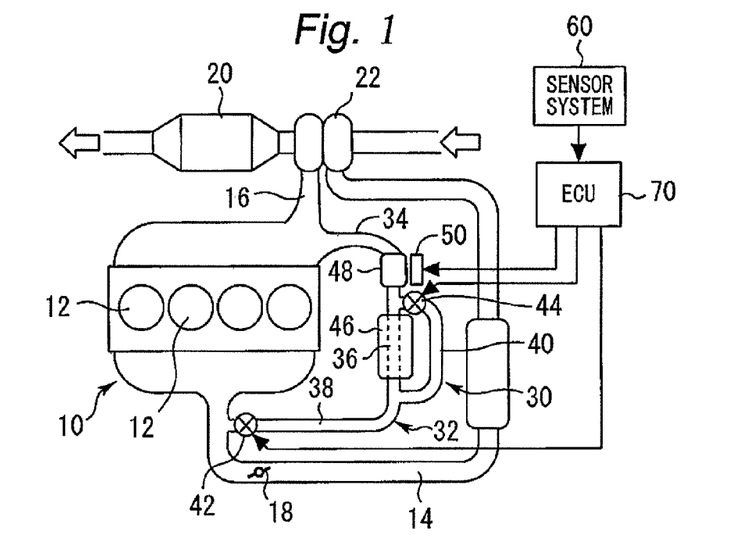
FIG. 1 is a configuration diagram for explaining a system configuration of an engine according to the first embodiment of the present invention.
Figure 2:
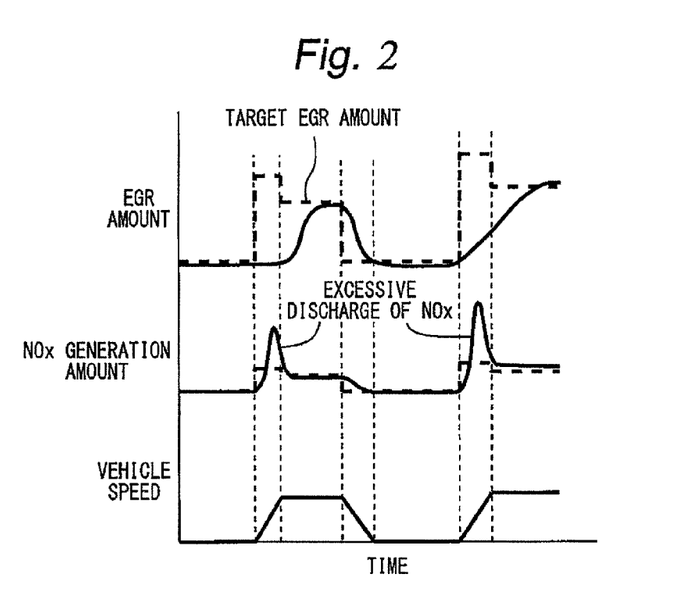
FIG. 2 is a timing chart for explaining the effect which is obtained according to the first embodiment of the present invention.
Figure 3:
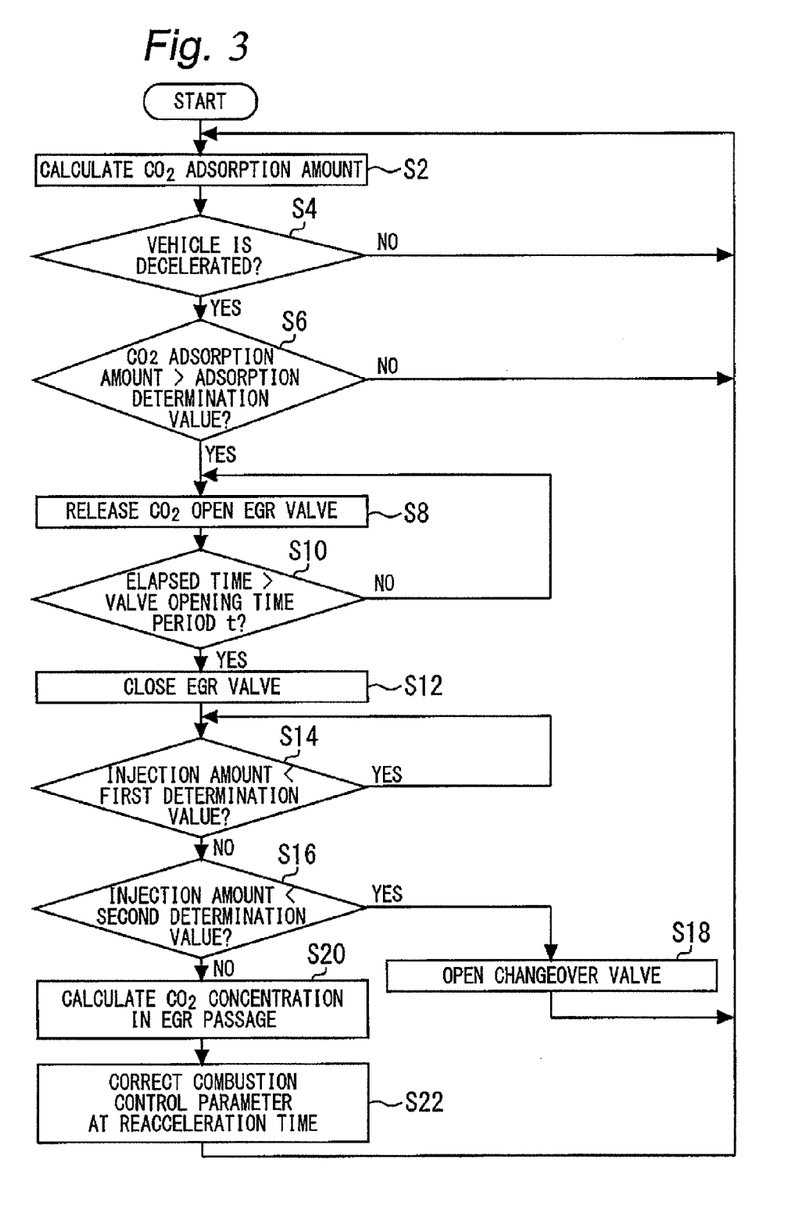
FIG. 3 is a flowchart showing one example of control which is executed by the ECU in the first embodiment of the present invention.

Embodiment 1
[Configuration of the First Embodiment]
Hereinafter, a first embodiment of the present invention will be described with reference to FIGS. 1 to 3. FIG. 1 is a configuration diagram for explaining a system configuration of an engine according to the first embodiment of the present invention. A system of the present embodiment includes an engine 10 as an internal combustion engine. FIG. 1 illustrates a four-cylinder engine, but the present invention can be applied to an internal combustion engine with an optional number of cylinders. Each cylinder 12 of the engine 10 includes a fuel injection valve, an ignition plug, an intake valve, an exhaust valve and the like.

Further, the engine 10 includes an intake passage 14 that takes intake air into respective cylinders 12, and an exhaust passage 16 that discharges an exhaust gas from the respective cylinders 12. In the intake passage 14, a throttle valve 18 that regulates an intake air amount is provided. In the exhaust passage 16, a catalyst 20 that purifies an exhaust gas is provided. Further, between the intake passage 14 and the exhaust passage 16, a turbocharger 22 that boosts the intake air by using exhaust pressure is provided. The present invention is also applicable to a natural aspiration type internal combustion engine which is not loaded with the turbocharger 22.

The engine 10 includes an EGR mechanism 30 that recirculates part of an exhaust gas into an intake system as an EGR gas. In the present description, the EGR gas means the exhaust gas which flows into the EGR passage 32, and CO2 that is released from a CO2 adsorbent 48 which will be described later. The EGR mechanism 30 includes an EGR passage 32, an EGR valve 42, a changeover valve 44, an EGR cooler 46 and the like. The EGR passage 32 connects the intake passage 14 and the exhaust passage 16, and is configured by an upstream EGR passage 34, a middle EGR passage 36, a downstream EGR passage 38 and a bypass passage 40. The upstream EGR passage 34 configures a most upstream part of the EGR passage 32 in a flow direction of the EGR gas, and is connected to the exhaust passage 16.

The middle EGR passage 36 configures an EGR partial passage, and is located between the CO2 adsorbent 48 and the EGR valve 42, in the present embodiment. An upstream end of the middle EGR passage 36 is connected to the upstream EGR passage 34. A downstream end of the middle EGR passage 36 is connected to the downstream EGR passage 38. The downstream EGR passage 38 configures a most downstream portion of the EGR passage 32, and is connected to the intake passage 14. Between the upstream EGR passage 34 and the downstream EGR passage 38, the middle EGR passage 36 and the bypass passage 40 are connected in parallel with each other. The bypass passage 40 is formed as a passage that bypasses the middle EGR passage 36. That is to say, the bypass passage 40 branches from a connection portion of the upstream EGR passage 34 and the middle EGR passage 36, and merges into a connection portion of the middle EGR passage 36 and the downstream EGR passage 38.

The EGR valve 42 regulates an amount of the EGR gas (the EGR amount) which is recirculated into the intake passage 14 via the EGR passage 32. The EGR valve 42 is configured by an electromagnetic drive type flow regulating valve, for example, and is provided at a most downstream portion of the downstream EGR passage 38. The changeover valve 44 switches a channel for the gas flowing in the upstream EGR passage 34 to either the middle EGR passage 36 or the bypass passage 40. The changeover valve 44 is configured by a normally closed (normal close) electromagnetic valve or the like, and is provided at a most upstream portion of the bypass passage 40, for example. The EGR cooler 46 is configured to cool the EGR gas which flows in the middle EGR passage 36.

The engine 10 includes the CO2 adsorbent 48, and a heater 50. The CO2 adsorbent 48 adsorbs and releases CO2 in response to a temperature state, is provided in the upstream EGR passage 34, and is disposed at an upstream side of the EGR valve 42. As a main material composing the CO2 adsorbent 48, for example, lithium zirconate ($Li_2ZrO_3$), lithium compounds such as $LiSiO_4$ and $LiFeO_2$, and $Ba_2TiO_4$ are known. The CO2 adsorbent 48 adsorbs CO2 in a temperature region (an adsorption temperature region) of 400 to 600° C., for example. Further, in a temperature region of 700° C. to 800° C. (a release temperature region), for example, the CO2 adsorbent 48 releases adsorbed CO2. The composing material and the temperature regions of the CO2 adsorbent 48 described above are only examples, and do not restrict the present invention. The heater 50 heats the CO2 adsorbent 48 to cause the CO2 adsorbent 48 to release CO2, is formed of a nichrome wire, for example, and is attached to the CO2 adsorbent 48.

Further, the system of the present embodiment includes a sensor system 60 that detects operation states of the engine 10 and a vehicle, and an ECU (Electronic Control Unit) 70 that controls the engine 10 based on outputs from the sensor system 60. The sensor system 60 includes various sensors including a crank angle sensor, an air flow sensor, an accelerator opening degree sensor and the like. The crank angle sensor is a sensor for detecting a rotational speed of a crankshaft (an engine rotation speed) and a crank angle of a crankshaft. The air flow sensor detects an intake air amount, and the accelerator opening degree sensor detects an accelerator operation amount by a driver.

The ECU 70 includes a storage circuit in which various control programs are stored in advance, a central processing unit (CPU) that executes control based on the respective control programs, and an input/output circuit that inputs and outputs signals from and to the central processing unit. Respective sensors of the sensor system are connected to an input side of the ECU 70. Various actuators including fuel injection valves and ignition plugs of the respective cylinders, the EGR valve 42, the changeover valve 44, the heater 50 and the like are connected to an output side of the ECU 70. The ECU 70 calculates an intake air amount, an engine rotation speed, an engine load and the like based on outputs from the sensor system 60, and drives the respective actuators based on the calculation results.

Next, control that is executed by the ECU 70 will be described. The ECU 70 determines whether or not an EGR request occurs based on an operation state of the engine 10, and executes EGR control when an EGR request occurs. In the EGR control, the ECU 70 sets a target EGR amount based on the operation state, and performs feedback control of an opening degree of the EGR valve 42 so that an actual EGR amount follows the target EGR amount. Thereby, the EGR gas flows through the upstream EGR passage 34, the middle EGR passage 36 and the downstream EGR passage 38 in sequence to be recirculated into the intake passage 14, and EGR is executed.

In the present embodiment, CO2 accumulation control is executed when an EGR request does not occur. In the CO2 accumulation control, the heater 50 is actuated first in a state in which the EGR valve 42 and the changeover valve 44 are closed, and the CO2 adsorbent 48 is heated. Subsequently, the temperature of the CO2 adsorbent 48 is kept in a release temperature region, and CO2 is released into the upstream EGR passage 34 from the CO2 adsorbent 48. Next, the EGR valve 42 is opened for a valve opening set time period t that is set in advance, and an EGR gas is allowed to flow out to the intake passage 14 from the downstream EGR passage 38.

Here, the valve opening set time period t of the EGR valve 42 is set to correspond to a time period necessary for a gas staying in the middle EGR passage 36 to be replaced with the CO2 which is released from the CO2 adsorbent 48, for example. Citing a specific example, the valve opening set time period t is set based on a flow of the gas which flows into the engine 10, an opening degree of the EGR valve 42, and a capacity (for example, a capacity of the middle EGR passage 36) of a site of the EGR passage 32, which is located between the CO2 adsorbent 48 and the EGR valve 42. In the present invention, the valve opening set time period t may be set at a fixed value. While the EGR valve 42 opens, the gas staying in the middle EGR passage 36 is discharged from the EGR valve 42, and the CO2 which is released from the CO2 adsorbent 48 stays in the middle EGR passage 36. After the valve opening set time period t elapses, the middle EGR passage 36 is in a state filled with CO2, and therefore, at this point of time, the EGR valve 42 is closed, whereby the CO2 accumulation control is ended.

As above, in the present embodiment, CO2 can be accumulated in the EGR passage 32 by the CO2 accumulation control, when an EGR request does not occur as in a deceleration time, for example. Accordingly, when an EGR request occurs from the state (for example, at a reacceleration time after deceleration, and the like), CO2 which is accumulated in the EGR passage 32 can be quickly supplied into the cylinders by opening the EGR valve 42. That is to say, when an EGR request occurs, a time which is taken to release CO2 from the CO2 adsorbent 48 is not needed, and therefore, EGR using CO2 can be started quickly. Further, when a large amount of EGR is suddenly needed, a sufficient amount of CO2 can be supplied into the cylinders in a short time. Accordingly, a delay in EGR which easily occurs at the time of transition is restrained, and exhaust emission can be reduced.

Further, in the present embodiment, the valve opening set time period t can be properly set based on the flow of the gas flowing into the engine 10, the opening degree of the EGR valve 42, the capacity of the middle EGR passage 36 which is known and the like. Thereby, the gas staying in the middle EGR passage 36 can be stably replaced with the CO2 which is released from the CO2 adsorbent 48. That is to say, insufficiency of the accumulation amount of CO2 accumulated in the middle EGR passage 36, and leakage of the CO2 into the intake passage 14 from the middle EGR passage 36 due to an excessive accumulation action can be avoided.

(Modification)

In the first embodiment, the case where the site (the EGR partial passage) of the EGR passage 32, which is located between the CO2 adsorbent 48 and the EGR valve 42, is the middle EGR passage 36 is illustrated. However, the present invention is not limited to this, and a configuration in which CO2 is accumulated only in the EGR cooler 46, that is, the configuration in which the EGR partial passage is the EGR cooler 46 may be adopted. In this case, the valve opening set time period t is set based on the flow of the gas flowing into the engine 10, the opening degree of the EGR valve 42, and the capacity of the EGR cooler 46 which is known.

According to the above described modification, in the CO2 accumulation control, CO2 which is released from the CO2 adsorbent 48 can be accumulated in only an inside of the EGR cooler 46. Further, when CO2 which is released from the CO2 adsorbent 48 is not used, the CO2 is released to a downstream side of the EGR cooler 46 via the bypass passage 40. At this time, if accumulated CO2 is also present at the downstream side of the EGR cooler 46, high-concentration CO2 is supplied to the engine 10 by the CO2. As a result, combustibility is worsened, and CO2 is consumed wastefully. In relation to this, according to the above described modification, CO2 is not accumulated at the downstream side from the EGR cooler 46, and therefore, when CO2 is released by bypassing the EGR cooler 46, high-concentration CO2 can be avoided from being supplied to the engine 10. Accordingly, combustibility can be favorably kept, and CO2 can be effectively used.

Next, with reference to FIG. 2, an effect of the first embodiment will be described. FIG. 2 is a timing chart for explaining the effect which is obtained according to the first embodiment of the present invention. As shown in the drawing, in the prior art, when acceleration is performed again after a vehicle decelerates, even if the target EGR amount is set to be large, a delay in EGR easily occurs. As a result, excessive NOx is discharged at the time of reacceleration into the exhaust gas, and exhaust emission increases. In relation to this, in the present embodiment, a delay in EGR is restrained, and therefore, excessive discharge of NOx is avoided, and exhaust emission can be improved.

In addition, CO2 has a smaller specific heat ratio than an ordinary exhaust gas. Therefore, in EGR using CO2, the combustion temperature can be efficiently lowered with an EGR amount smaller than usual. Citing a specific example, the specific heat ratio in the case of an EGR rate being set at 30% in the EGR by an ordinary exhaust gas is realized by setting the EGR rate at 5% in the EGR by CO2. Accordingly, at a time of start of EGR, CO2 which is accumulated in advance is immediately supplied, whereby a high EGR effect can be exhibited with a relatively small amount of CO2. Further, in the above described comparison condition, an oxygen concentration in the cylinders is approximately 15% in ordinary EGR, whereas the oxygen concentration is increased to approximately 20% in EGR using CO2. Thereby, the cylinder oxygen concentration at the time of EGR execution is enhanced, and combustibility can be improved.

Further, the CO2 which is released from the CO2 adsorbent 48 is in a state with a high temperature by heating of the heater 50. Therefore, in the present embodiment, the EGR cooler 46 is disposed in the middle EGR passage 36 in which CO2 is accumulated. Thereby, the CO2 which is accumulated in the middle EGR passage 36 can be cooled efficiently by the EGR cooler 46. Accordingly, the temperature of the EGR gas which flows into the cylinders is restrained, and the combustion temperature can be lowered.

Further, the temperature of the exhaust gas is 200 to 600° C. in a diesel engine, for example, which is lower than the heat release temperature region of the CO2 adsorbent 48. Therefore, in the CO2 accumulation control, a configuration that opens the EGR valve 42 after the CO2 adsorbent 48 is heated by the heater 50 may be adopted as described above. Thereby, the CO2 adsorbent 48 while heated is prevented from being cooled by the flow of the exhaust gas, and heating can be performed efficiently. Accordingly, heating of the CO2 adsorbent 48 is completed in a short time, and controllability can be improved. The EGR valve 42 may be opened after the temperature of the CO2 adsorbent 48 reaches the release temperature region. Thereby, the above described effect can be exhibited more remarkably.

Further, in the CO2 accumulation control, a configuration which opens the EGR valve 42 for only the valve opening set time period t which is necessary to accumulate CO2 in the middle EGR passage 36, for example, as described above may be adopted. Thereby, at the time of execution of the CO2 accumulation control, the amount of CO2 which flows out to the intake passage 14 can be restrained. That is to say, in the state in which an EGR request does not occur, CO2 can be restrained from wastefully flowing out from the EGR passage 32. Accordingly, even when adsorbing performance of the CO2 adsorbent 48 is not high, the adsorbed CO2 can be effectively used. Further, the concentration of the CO2 which is accumulated in the middle EGR passage 36 can be regulated properly based on the valve opening set time period t. As a result, a misfire can be prevented from occurring at the time of EGR due to an excessively high concentration of the accumulated CO2.

Further, during an engine operation, control of opening and closing the changeover valve 44 (hereinafter, described as EGR switching control) based on a magnitude of an engine load may be executed. Citing a specific example, the ECU 70 stores a first and a second determination values in advance. The first determination value is set to correspond to a small engine load which does not require EGR. The second determination value is set to correspond to a relatively small engine load which can be handled even with ordinary EGR which does not use CO2, for example. Accordingly, the first determination value is set at a value smaller than the second determination value.

When the engine load is smaller than the first determination value, the ECU 70 determines it as an operation state that does not require EGR as in an operation state after deceleration, and in an idle operation, for example. In this case, as described above, the ECU 70 executes the CO2 accumulation control in the state in which the EGR valve 42 and the changeover valve 44 are closed. Further, when the engine load is larger than the first determination value, and is smaller than the second determination value, the ECU 70 determines that though EGR is needed, the operation state can be handled without increasing exhaust emission even with ordinary EGR. As examples of such an operation state, an idle operation, a low-load operation and the like are cited. In this case, the ECU 70 opens the changeover valve 44, and opens the EGR valve 42 to a necessary opening degree. Thereby, the exhaust gas to be the EGR gas sequentially flows through the upstream EGR passage 34, the bypass passage 40 and the downstream EGR passage 38 and is recirculated to the intake passage 14. At this time, the middle EGR passage 36 is kept in a state where CO2 is accumulated, and therefore, the EGR without using CO2 is executed.

When the engine load is larger than the second determination value, the ECU 70 determines that the operation state is suitable for the EGR using CO2. In this case, the EGR valve 42 is opened to a necessary opening degree in the state in which the changeover valve 44 is closed. Thereby, the CO2 accumulated in the EGR passage 32 is recirculated to the intake passage 14 together with exhaust gas, and the EGR using CO2 is executed.

According to the aforementioned EGR switching control, when such an EGR request as not to require CO2 occurs, the exhaust gas to be the EGR gas can be caused to flow through the bypass passage 40. Thereby, at the time of a low-load operation such as an operation after deceleration, and an idle operation, for example, CO2 which is accumulated in the middle EGR passage 36 is retained, and wasteful consumption of CO2 can be avoided. Accordingly, only when CO2 is needed, the accumulated CO2 can be efficiently used. Further, occurrence of a misfire or the like due to CO2 being supplied into the cylinders at the low-load operation can be avoided.

[Specific Processing for Realizing First Embodiment]

Next, with reference to FIG. 3, specific processing for realizing the aforementioned control will be described. FIG. 3 is a flowchart showing one example of control which is executed by the ECU in the first embodiment of the present invention. In a routine shown in the drawing is repeatedly executed during an engine operation. In the routine shown in FIG. 3, an adsorption amount of CO2 which is adsorbed to the CO2 adsorbent 48 is calculated first in step S2.

Citing a specific example, in calculation processing of the adsorption amount, an increment of the adsorption amount is calculated first based on the temperature of the exhaust gas which reaches the position of the CO2 adsorbent 48, the CO2 concentration in the exhaust gas, and an adsorption characteristic of the CO2 adsorbent 48 which is stored in advance. Subsequently, by integrating the increment of the adsorption amount calculated at each arithmetic operation processing in step S2, the adsorption amount of CO2 is calculated. The CO2 concentration in the exhaust gas is estimated, for example, based on the intake air amount, the engine rotation speed, the fuel injection amount and the like.

Next, in step S4, it is determined whether or not the vehicle is in a deceleration state. When the determination in step S4 is established, fuel cut is executed, and the flow shifts to step S6. When the determination in step S4 is not established, CO2 accumulation control is not executed, and therefore, the flow returns to step S2. Next, in step S6, it is determined whether or not the adsorption amount of CO2 is larger than an adsorption determination value which is set in advance. The adsorption determination value is set to correspond to a minimum adsorption amount required to execute the CO2 accumulation control, for example.

When the determination in step S6 is established, the adsorption amount of CO2 is sufficient, and therefore, the CO2 accumulation control is executed by step S8. More specifically, after the CO2 adsorbent 48 is heated by the heater 50, the EGR valve 42 is opened. Subsequently, a counter for measuring an elapsed time after the EGR valve 42 is opened is actuated, and the flow shifts to step S10. When the determination in step S6 is not established, the adsorption amount of CO2 is insufficient. Therefore, the CO2 accumulation control is not executed, and the flow returns to step S2.

Next, in step S10, it is determined whether or not the elapsed time after the EGR valve 42 is opened exceeds the aforementioned valve opening set time period t. When the determination in step S10 is established, the flow shifts to step S12, where the EGR valve 42 is closed, and the CO2 accumulation control is ended. When the determination in step S10 is not established, the flow returns to step S8, and the CO2 accumulation control is continued until the valve opening set time period t elapses.

Next, in steps S14 and S16, the magnitude of the engine load is determined based on the first determination value and the second determination value described above. In these steps, a case using the fuel injection amount as a parameter corresponding to the engine load is illustrated. Describing more specifically, in step S14, it is determined whether or not a present fuel injection amount is smaller than the aforementioned first determination value first. When the determination in step S14 is established, it is determined that though some fuel injection is performed, the engine load is small, and the operation state does not require EGR, and the flow is on standby until the engine load increases. When the determination in step S14 is not established, the flow shifts to step S16.

Next, in step S16, it is determined whether or not the fuel injection amount is smaller than the second determination value. When the determination is established, it is determined that since the engine load is somewhat larger, EGR is required, but the operation state can be handled without increasing exhaust emission even by ordinary EGR which does not use CO2. Therefore, in this case, the flow shifts to step S18, where the changeover valve 44 is opened and the ordinary EGR is executed, and thereafter, the flow returns to step S2.

When the determination in step S16 is not established, the engine load is sufficiently large, and therefore, the operation state is determined as suitable for the EGR using CO2. Therefore, in this case, the flow shifts to step S20 first, and the CO2 concentration in the EGR passage 32 is calculated. The CO2 concentration in the EGR passage 32 can be calculated based on the adsorption amount of CO2 by the CO2 adsorbent 48, the release characteristic of CO2 which is stored in advance, the temperature, and the capacities of the respective parts of the EGR passage 32, for example.

Next, in step S22, a combustion parameter at the time of reacceleration is corrected based on the calculation value of the CO2 concentration. Citing a specific example, the EGR amount (the opening degree of the EGR valve 42) is corrected to correspond to high-concentration CO2, and a misfire is prevented. Further, the fuel injection amount, the interval of the injection, injection timing and the like at the time of execution of pilot injection are also corrected. Thereby, at the time of reacceleration, fuel control suited to the EGR can be realized while EGR is executed by using the CO2 which is accumulated in the EGR passage 32.

Embodiment 2

Figure 4:
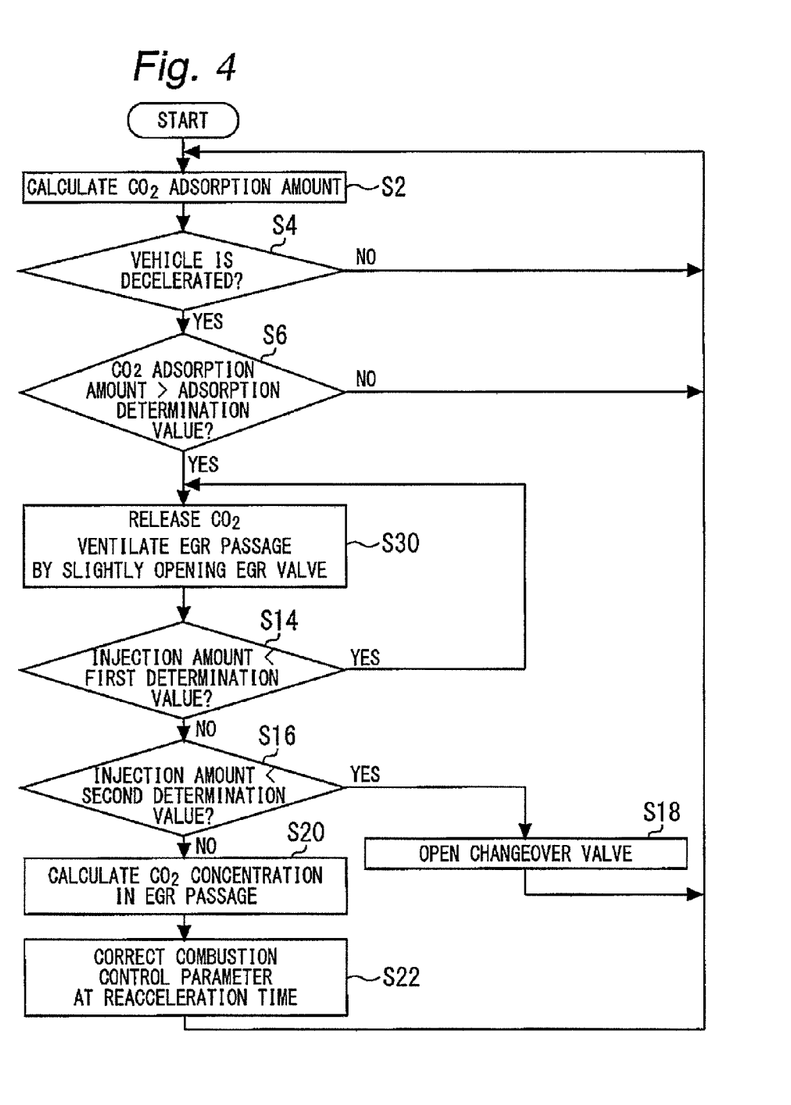
FIG. 4 is a flowchart showing an example of control which is executed by the ECU in the second embodiment of the present invention.

Next, with reference to FIG. 4, a second embodiment of the present invention will be described. The present embodiment has a feature in which at the time of execution of the CO2 accumulation control, the EGR valve is kept in a state in which the EGR valve is opened slightly. FIG. 4 is a flowchart showing an example of control which is executed by the ECU in the second embodiment of the present invention. A routine shown in FIG. 4 is a result of replacing steps S8 and S10 in FIG. 3 with step S30, and therefore, explanation of the steps which are already described will be properly omitted.

In the routine shown in FIG. 4, the CO2 accumulation control is executed in step S30. In the control, the CO2 adsorbent 48 is heated by the heater 50 first in the state in which the EGR valve 42 and the changeover valve 44 are closed. Next, the EGR valve 42 is opened by a very small opening degree which is set in advance. Thereby, an exhaust gas staying in the EGR passage 32 gradually flows out of the EGR valve 42, and is replaced by CO2 which is released from the CO2 adsorbent 48. In this manner, in the present embodiment, CO2 is accumulated while gas in the EGR passage 32 is always ventilated during the CO2 accumulation control. The aforementioned very small opening degree is defined as such a small opening degree that does not worsen a combustion state even if a small amount of EGR is performed, for example.

Next, in step S14, it is determined whether or not the present fuel injection amount is smaller than the aforementioned first determination value. When the determination is established, it is determined that though fuel injection is performed to some extent, the engine load is small, and EGR is not required. Therefore, in this case, the flow returns to step S30 until the engine load increases, and the CO2 accumulation control is continued. When the determination in step S14 is not established, processing in step S16 and the following steps is executed, as described above.

In the present embodiment configured as above, an effect which is substantially similar to the effect of the first embodiment can be obtained. Further, in the present embodiment, the EGR valve 42 is always opened by a very small opening degree in order to perform the CO2 accumulation control. Thereby, a CO2 concentration in the intake passage 14 and the cylinders is increased, and the effect of restraining NOx can be improved. Further, the valve opening time period of the EGR valve 42 does not have to be managed, and therefore, control can be simplified.

Embodiment 3

Figure 5:
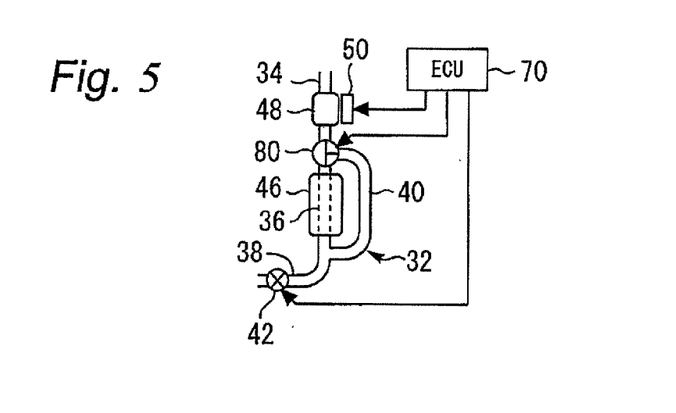
FIG. 5 is an essential part enlarged diagram of an engine showing an EGR mechanism according the third embodiment of the present invention.

Next, with reference to FIG. 5, a third embodiment of the present invention will be described. The present embodiment has a feature of using a three-way valve as a changeover valve. FIG. 5 is an essential part enlarged diagram of an engine showing an EGR mechanism according the third embodiment of the present invention. In the present embodiment, the same components as in the first embodiment are assigned with the same reference signs, and explanation thereof will be omitted.

A system of the present embodiment adopts an electromagnetic drive type three-way valve 80 in place of the changeover valve 44. The three-way valve 80 has one inflow port and two outflow ports, and the inflow port is connected to a downstream end of the upstream EGR passage 34. One of the outflow ports of the three-way valve 80 is connected to an upstream end of the middle EGR passage 36, and the other outflow port is connected to an upstream end of the bypass passage 40. The three-way valve 80 is controlled by the ECU 70, and is configured to switch a channel of a gas to either the middle EGR passage 36 or the bypass passage 40.

In the present embodiment which is configured as above, an operational effect similar to the operational effect of the aforementioned first embodiment can be also obtained. Further, in the present embodiment, by using the three-way valve 80, in the state in which either one of the middle EGR passage 36 or the bypass passage 40 is shut off, the gas can be caused to flow through the other passage. Accordingly, the effect by switch of these passages 36 and 40 can be exhibited more stably.

Embodiment 4

Figure 6:
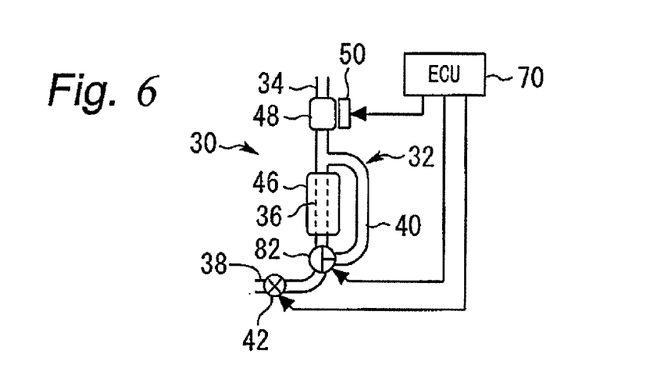
FIG. 6 is an essential part enlarged view of an engine showing an EGR mechanism according to the fourth embodiment of the present invention.

Next, with reference to FIG. 6, a fourth embodiment of the present invention will be described. The present embodiment has a feature of adopting a three-way valve as a changeover valve, and disposing the three-way valve at a downstream side of a bypass passage. FIG. 6 is an essential part enlarged view of an engine showing an EGR mechanism according to the fourth embodiment of the present invention. In the present embodiment, the same components as in the first embodiment are assigned with the same reference signs and explanation thereof will be omitted.

A system of the present embodiment adopts an electromagnetic drive type three-way valve 82 in place of the changeover valve 44. The three-way valve 82 has two inflow ports and one outflow port, and the outflow port is connected to an upstream end of the downstream EGR passage 38. One of the inflow ports of the three-way valve 82 is connected to a downstream end of the middle EGR passage 36, and the other inflow port is connected to a downstream end of the bypass passage 40. The three-way valve 82 is controlled by the ECU 70, and is configured to switch a channel of a gas to either the middle EGR passage 36 or the bypass passage 40. In the present embodiment configured as above, an operational effect similar to the operational effects of the aforementioned first and third embodiments can be also obtained.

Embodiment 5

Figure 7:
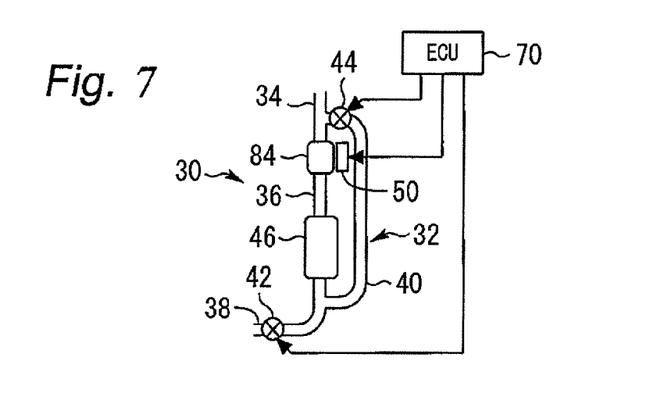
FIG. 7 is an essential part enlarged view of an engine showing an EGR mechanism according to the fifth embodiment of the present invention.

Next, with reference to FIG. 7, a fifth embodiment of the present invention will be described. The present embodiment has a feature of disposing a CO2 adsorbent in the middle EGR passage. FIG. 7 is an essential part enlarged view of an engine showing an EGR mechanism according to the fifth embodiment of the present invention. In the present embodiment, the same components as in the first embodiment are assigned with the same reference signs, and explanation thereof will be omitted.

A system of the present embodiment includes a CO2 adsorbent 84 configured as in the first embodiment, and the heater 50 is attached to the CO2 adsorbent 84. However, the CO2 adsorbent 84 is disposed in the middle EGR passage 36. In the present embodiment, a site of the middle EGR passage 36, which is located at a downstream side from the CO2 adsorbent 84 configures an EGR partial passage. In the present embodiment which is configured as above, an operational effect similar to the operational effect in the first embodiment can be also obtained. Further, in the present embodiment, CO2 which is released from the CO2 adsorbent 84 can be reliably caused to flow through the EGR cooler 46, and CO2 can be efficiently cooled.

In the aforementioned first and second embodiments, as the timing when the CO2 accumulation control is executed, the deceleration time is mainly described as an example. However, the present invention is not limited to this, and may have a configuration that also executes the CO2 accumulation control in operation states at the time of an idle operation, and before engine stoppage, for example, when an EGR request is expected to occur suddenly immediately thereafter.

Further, in the aforementioned first to fifth embodiments, the systems including the bypass passage 40 and the changeover valve 44 are illustrated. However, the present invention may be applied to a system in which the bypass passage 40 and the changeover valve 44 are not mounted. In this case, the middle EGR passage 36 and the downstream EGR passage 38 correspond to the EGR partial passage.

Further, in the aforementioned first to fifth embodiments, explanation is made by citing the HPL type EGR mechanism 30 which recirculates the exhaust gas which is taken out from the exhaust passage 16 at the upstream side of the catalyst 20 to the intake passage 14 at the downstream side of the throttle valve 18, as an example. However, the present invention is not limited to this, and may be applied to an LPL type EGR mechanism that recirculates an exhaust gas which is taken out from the downstream side of the catalyst 20 to the upstream side of the throttle valve 18.

Further, in the aforementioned first to fifth embodiments, the configurations different from one another are illustrated, but the present invention is not limited to only these configurations. That is to say, the present invention is applied to systems in which optional combinable configurations out of the configurations shown in the first to fifth embodiments are combined.

DESCRIPTION OF REFERENCE CHARACTERS

10 engine (internal combustion engine), 12 cylinder, 14 intake passage, 16 exhaust passage, 18 throttle valve, 20 catalyst, 30 EGR mechanism, 32 EGR passage, 34 upstream EGR passage, 36 middle EGR passage (EGR partial passage), 38 downstream EGR passage, 40 bypass passage, 42 EGR valve, 44 changeover valve, 46 EGR cooler, 48,84 CO2 adsorbent, 50 heater, 60 sensor system, 70 ECU, 80,82 three-way valve (changeover valve)

The invention claimed is:

1. An internal combustion engine, comprising:
   an EGR passage that is connected to an intake passage and an exhaust passage of an internal combustion engine, and recirculates part of an exhaust gas to the intake passage as an EGR gas;
   an EGR valve that is provided in the EGR passage, and regulates an amount of the EGR gas which is recirculated to an intake system via the EGR passage;
   a CO2 adsorbent that is provided in the EGR passage at an upstream side of the EGR valve, and has a function of adsorbing CO2 in an adsorption temperature region and a function of releasing CO2 in a release temperature region that is higher in temperature than the adsorption temperature region;
   a heater for heating the CO2 adsorbent;
   an EGR partial passage included in the EGR passage and located between the CO2 adsorbent and the EGR valve; and
   an electronic control unit operatively connected to the EGR valve and the heater, the electronic control unit configured to execute a CO2 accumulation control when an EGR request does not occur, the electronic control unit executes the CO2 accumulation control to:
   control the heater to keep a temperature of the CO2 adsorbent in the release temperature region; and
   open the EGR valve for a valve opening set time period which is set so that a gas in the EGR partial passage is replaced with CO2 that is released from the CO2 adsorbent.

2. The internal combustion engine according to claim 1, wherein the valve opening set time period is configured to be set based on a flow of a gas that flows into the internal combustion engine, and an opening degree of the EGR valve.

3. An internal combustion engine, comprising:
   an EGR passage that is connected to an intake passage and an exhaust passage of an internal combustion engine, and recirculates part of an exhaust gas to the intake passage as an EGR gas;
   an EGR valve that is provided in the EGR passage, and regulates an amount of the EGR gas which is recirculated to an intake system via the EGR passage;
   a CO2 adsorbent that is provided in the EGR passage at an upstream side of the EGR valve, and has a function of adsorbing CO2 in an adsorption temperature region and a function of releasing CO2 in a release temperature region that is higher in temperature than the adsorption temperature region;
   a heater for heating the CO2 adsorbent;
   an EGR partial passage included in the EGR passage and located between the CO2 adsorbent and the EGR valve; and
   an electronic control unit operatively connected to the EGR valve and the heater, the electronic control unit configured to execute a CO2 accumulation control when an EGR request does not occur, the electronic control unit executes the CO2 accumulation control to:
   control the heater to keep a temperature of the CO2 adsorbent in the release temperature region; and
   keep the EGR valve in a state in which the EGR valve is opened by an opening degree to replace the gas in the EGR partial passage with the CO2 released from the CO2 adsorbent.

4. The internal combustion engine according to claim 1, wherein the electronic control unit is configured to execute the CO2 accumulation control to open the EGR valve after heating the CO2 adsorbent by the heater, when replacing the gas in the EGR partial passage with the CO2.

5. The internal combustion engine according to claim 1, further comprising:
   a bypass passage that configures a part of the EGR passage, and is connected in parallel with the EGR partial passage to bypass the EGR partial passage; and
   a changeover valve that is driven by the control device, and switches a channel of the gas to either the EGR partial passage or the bypass passage,
   wherein the electronic control unit is configured to include:
   a first determination value that is set to correspond to a small engine load which does not need EGR, and
   a second determination value that is set at a value larger than the first determination value, and corresponds to an engine load that can be handled by EGR without using CO2,
   wherein the electronic control unit is configured to:
   execute the CO2 accumulation control, when the engine load is smaller than the first determination value,
   execute EGR without using CO2 by causing the EGR gas to flow through the bypass passage, when the engine load is larger than the first determination value, and is smaller than the second determination value, and
   execute EGR using CO2 by causing the EGR gas to flow through the EGR partial passage, when the engine load is larger than the second determination value.

6. The internal combustion engine according to claim 1, further comprising:
   an EGR cooler that is provided in the EGR partial passage and cools a gas.

7. The internal combustion engine according to claim 2, wherein the electronic control unit is configured to execute the CO2 accumulation control to open the EGR valve after heating the CO2 adsorbent by the heater, when replacing the gas in the EGR partial passage with the CO2.

8. The internal combustion engine according to claim 2, further comprising:
   a bypass passage that configures a part of the EGR passage, and is connected in parallel with the EGR partial passage to bypass the EGR partial passage; and
   a changeover valve that is driven by the control device, and switches a channel of the gas to either the EGR partial passage or the bypass passage,
   wherein the electronic control unit is configured to include:
   a first determination value that is set to correspond to a small engine load which does not need EGR, and
   a second determination value that is set at a value larger than the first determination value, and corresponds to an engine load that can be handled by EGR without using CO2,
   wherein the electronic control unit is configured to:
   execute the CO2 accumulation control, when the engine load is smaller than the first determination value,
   execute EGR without using CO2 by causing the EGR gas to flow through the bypass passage, when the engine load is larger than the first determination value, and is smaller than the second determination value, and execute EGR using CO2 by causing the EGR gas to flow through the EGR partial passage, when the engine load is larger than the second determination value.

9. The internal combustion engine according to claim 3, further comprising:

a bypass passage that configures a part of the EGR passage, and is connected in parallel with the EGR partial passage to bypass the EGR partial passage; and a changeover valve that is driven by the control device, and switches a channel of the gas to either the EGR partial passage or the bypass passage, wherein the electronic control unit is configured to include:

a first determination value that is set to correspond to a small engine load which does not need EGR, and a second determination value that is set at a value larger than the first determination value, and corresponds to an engine load that can be handled by EGR without using CO2, wherein the electronic control unit is configured to:

execute the CO2 accumulation control, when the engine load is smaller than the first determination value, execute EGR without using CO2 by causing the EGR gas to flow through the bypass passage, when the engine load is larger than the first determination value, and is smaller than the second determination value, and execute EGR using CO2 by causing the EGR gas to flow through the EGR partial passage, when the engine load is larger than the second determination value.

10. The internal combustion engine according to claim 2, further comprising:

an EGR cooler that is provided in the EGR partial passage and cools a gas.

11. The internal combustion engine according to claim 3, further comprising:

an EGR cooler that is provided in the EGR partial passage and cools a gas.

12. The internal combustion engine according to claim 1, wherein the electronic control unit includes a storage circuit in which the CO2 accumulation control is stored and a processor that executes the CO2 accumulation control when the EGR request does not occur.

13. The internal combustion engine according to claim 2, wherein the electronic control unit includes a storage circuit in which the CO2 accumulation control is stored and a processor that executes the CO2 accumulation control when the EGR request does not occur.

14. The internal combustion engine according to claim 3, wherein the electronic control unit includes a storage circuit in which the CO2 accumulation control is stored and a processor that executes the CO2 accumulation control when the EGR request does not occur.

15. The internal combustion engine according to claim 4, wherein the electronic control unit includes a storage circuit in which the CO2 accumulation control is stored and a processor that executes the CO2 accumulation control when the EGR request does not occur.

16. The internal combustion engine according to claim 5, wherein the electronic control unit includes a storage circuit in which the CO2 accumulation control is stored and a processor that executes the CO2 accumulation control when the EGR request does not occur.

17. The internal combustion engine according to claim 6, wherein the electronic control unit includes a storage circuit in which the CO2 accumulation control is stored and a processor that executes the CO2 accumulation control when the EGR request does not occur.

18. The internal combustion engine according to claim 7, wherein the electronic control unit includes a storage circuit in which the CO2 accumulation control is stored and a processor that executes the CO2 accumulation control when the EGR request does not occur.

19. The internal combustion engine according to claim 8, wherein the electronic control unit includes a storage circuit in which the CO2 accumulation control is stored and a processor that executes the CO2 accumulation control when the EGR request does not occur.

20. The internal combustion engine according to claim 9, wherein the electronic control unit includes a storage circuit in which the CO2 accumulation control is stored and a processor that executes the CO2 accumulation control when the EGR request does not occur.

* * * * *

UNITED STATES PATENT AND TRADEMARK OFFICE
CERTIFICATE OF CORRECTION

| | | |
|---|---|---|
| PATENT NO. | : 9,845,748 B2 | Page 1 of 1 |
| APPLICATION NO. | : 14/816171 | |
| DATED | : December 19, 2017 | |
| INVENTOR(S) | : Yusuke Hoki | |

It is certified that error appears in the above-identified patent and that said Letters Patent is hereby corrected as shown below:

In Column 11, Line 42, delete "oft" and insert --off,-- therefor.

Signed and Sealed this
Twenty-second Day of May, 2018

Andrei Iancu
*Director of the United States Patent and Trademark Office*